United States Patent
Subramanian et al.

(10) Patent No.: US 10,664,536 B2
(45) Date of Patent: May 26, 2020

(54) CONSUMPTION OF USER-FILTERED DATA ON A CLIENT DEVICE

(71) Applicant: Microsoft Technology Licensing, LLC, Redmond, WA (US)

(72) Inventors: Uma Subramanian, Sammamish, WA (US); Andrew Byrne, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 408 days.

(21) Appl. No.: 14/974,767

(22) Filed: Dec. 18, 2015

(65) Prior Publication Data

US 2017/0177726 A1 Jun. 22, 2017

(51) Int. Cl.
*G06F 7/00* (2006.01)
*G06F 16/9535* (2019.01)
*G06F 16/23* (2019.01)

(52) U.S. Cl.
CPC ........ *G06F 16/9535* (2019.01); *G06F 16/235* (2019.01)

(58) Field of Classification Search
CPC .................................................... G06F 16/235
USPC ....................................................... 707/705
See application file for complete search history.

(56) References Cited

U.S. PATENT DOCUMENTS

| | | | |
|---|---|---|---|
| 6,073,165 A | 6/2000 | Narasimhan et al. | |
| 6,101,531 A | 8/2000 | Eggleston et al. | |
| 6,330,610 B1 | 12/2001 | Docter et al. | |
| 6,389,457 B2 | 5/2002 | Lazaridis et al. | |
| 6,421,709 B1 | 7/2002 | McCormick et al. | |
| 6,654,787 B1 | 11/2003 | Aronson et al. | |
| 7,072,942 B1 | 7/2006 | Maller | |
| 7,181,495 B2 | 2/2007 | Skladman et al. | |
| 7,801,960 B2 | 9/2010 | Hockey | |
| 8,112,529 B2 * | 2/2012 | van den Oord | G06F 40/274 709/227 |
| 8,645,471 B2 | 2/2014 | Onyon et al. | |
| 9,996,638 B1 * | 6/2018 | Holz | G06F 3/017 |
| 10,545,964 B2 * | 1/2020 | Pal | G06F 16/951 |

(Continued)

FOREIGN PATENT DOCUMENTS

WO 1999065256 A2 12/1999
WO 2002069585 A2 9/2002

OTHER PUBLICATIONS

"Email Filter Summary header Client Server Limited Storage", Published on: Oct. 3, 2012 Available at: https://www.pobox.com/features.

*Primary Examiner* — Eliyah S. Harper
(74) *Attorney, Agent, or Firm* — International IP Law Group, PLLC (57) ABSTRACT

Various techniques for consumption of user-filtered data on a client device are described herein. In one example, a method includes storing a detected filter corresponding to an object list and generating a data request based on the stored filter, wherein the data request can populate the object list. The method can also include retrieving data from a data repository based on the data request in response to a detected action, the retrieved data comprising a subset of fields corresponding to at least one object to be retrieved. Additionally, the method can include updating the object list based on the retrieved data and displaying the subset of fields of the at least one object in the object list.

18 Claims, 4 Drawing Sheets

(56) References Cited

U.S. PATENT DOCUMENTS

| | | | |
|---|---|---|---|
| 2001/0012286 A1 | 8/2001 | Huna | |
| 2002/0166118 A1* | 11/2002 | Kovan | G06F 16/958 725/1 |
| 2003/0229848 A1* | 12/2003 | Arend | G06F 16/00 715/227 |
| 2006/0156220 A1* | 7/2006 | Dreystadt | G06F 40/134 715/202 |
| 2006/0236288 A1* | 10/2006 | Ting | G06F 30/394 716/111 |
| 2008/0168135 A1* | 7/2008 | Redlich | G06Q 10/10 709/204 |
| 2015/0019537 A1* | 1/2015 | Neels | G06F 3/04847 707/722 |
| 2016/0077694 A1* | 3/2016 | Christoph | G06F 40/103 715/227 |
| 2016/0224676 A1* | 8/2016 | Miller | G06F 40/177 |

* cited by examiner

CONSUMPTION OF USER-FILTERED DATA ON A CLIENT DEVICE

BACKGROUND

Electronic devices can retrieve data using a variety of communication interfaces and protocols. For example, electronic devices can retrieve data using a post office protocol (POP), an internet message access protocol (IMAP), or a messaging application programming interface (MAPI), among others. The various communication protocols can enable devices to retrieve data stored on external servers. For example, the various communication protocols can enable a device to download requested emails from an email server.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system for retrieving data including a processor and a computer-readable memory storage device storing executable instructions that, based at least on execution by the processor, cause the processor to store a filter corresponding to an object list. The processor can also generate a data request based on the stored filter, the data request to populate the object list, and retrieve data from a data repository, such as a mail server, among others, based on the data request in response to a detected action, the retrieved data comprising a subset of fields corresponding to an object to be retrieved. Furthermore, the processor can update the object list based on the retrieved data.

Another embodiment provides a method for retrieving data that can include storing a detected filter corresponding to an object list and generating a data request based on the stored filter, the data request to populate the object list. The method can also include retrieving data from a data repository based on the data request in response to a detected action, wherein the retrieved data comprises a subset of the fields corresponding to at least one object to be retrieved, and updating the object list based on the retrieved data. Furthermore, the method can include displaying the subset of the fields of the at least one object in the object list.

Another embodiment provides one or more computer-readable storage devices for retrieving data comprising a plurality of instructions that, based at least on execution by a processor, cause the processor to store a detected filter corresponding to an object list and generate a data request based on the stored filter, the data request to populate the object list. The plurality of instructions can also cause the processor to retrieve data from a data repository based on the data request in response to a detected action, the retrieved data comprising a subset of fields corresponding to an object to be retrieved. Furthermore, the plurality of instructions can cause the processor to update the object list based on the retrieved data, detect a selection of an object in the object list and determine selected fields to display in response to detecting the selection, the selected fields comprising the subset of fields. Furthermore, the plurality of instructions can cause the processor to display the selected fields related to the selected object in the object list.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Users continue to generate larger amounts of data, which can result in larger data transfers and the consumption of additional resources in mobile devices. Accordingly, techniques to reduce the amount of data transmitted and received by the mobile devices can result in a greater utilization of resources.

The techniques described herein enable retrieving data based on a filter. A filter, as referred to herein, can include any set of configurable options that indicate a subset of data to be retrieved from a master set of data. In some embodiments, a filter can include any number of logical operators, keywords, or any combination thereof. In some examples, the data to be retrieved corresponds to objects displayed in an object list. An object, as referred to herein, can include an email, social media data, or any data associated with a user account or stored on an external server. The object list can include any information related to the objects. For example, the object list can include data pertaining to any number of fields of emails stored in an email account. In some embodiments, the filter can indicate a subset of emails and/or portions of the emails to retrieve from an email server. For example, the filter can indicate that only the author of an email, data of an email, and title of an email are to be retrieved. Accordingly, the techniques described herein can reduce the amount of data continuously retrieved to maintain a current state of an object list, such as a user's inbox, social media account, and the like.

Figure 1:
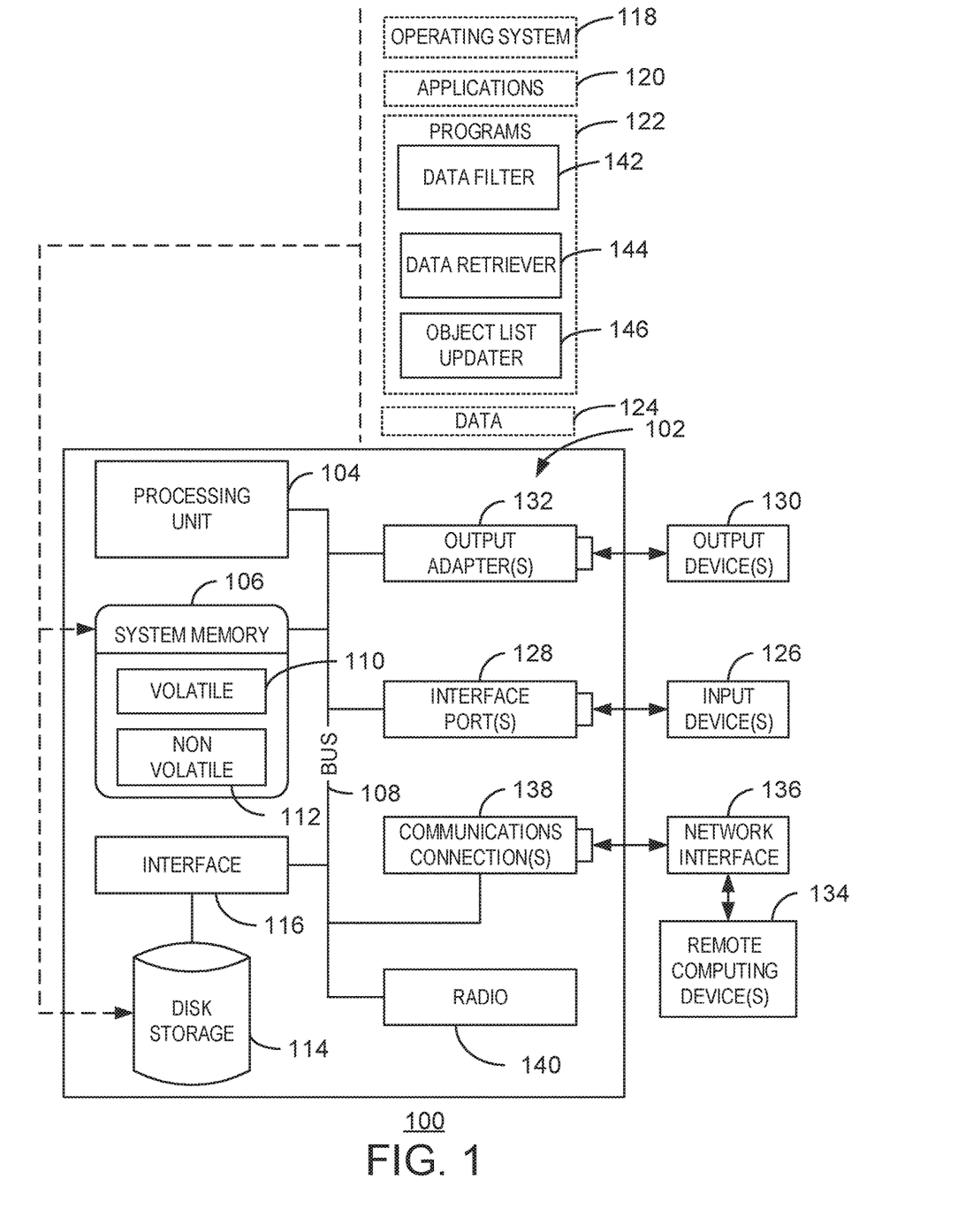
FIG. 1 is a block diagram of an example of a computing system that can retrieve data according to embodiments described herein.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can retrieve data. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through programs 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

An example processing unit 104 for the server may be a computing cluster. Additionally, the disk storage 114 can store various types of data 124 used for retrieving data. For example, the disk storage 114 may be an enterprise data storage system. In some examples, the disk storage 114 may store data 124 such as filters and objects in an object list. In some embodiments, the objects in the object list are stored only in volatile memory 110.

The computer 102 includes one or more programs 122, such as a data filter 142, a data retriever 144, and an object list updater 146. In some embodiments, the data filter 142 can detect a filter corresponding to an object list and generate a data request based on the filter, wherein the data request can populate the object list. In some embodiments, the filter can be generated based on detected configurable options. The options can include logical operators, search keywords, and the like. In some examples, each option can correspond to a separate field of an object such as a date of an object, an author of an object, or a title of an object, among others. The filter can enable an application to retrieve a subset of the data stored externally in a data repository such as a database, mail server, or external storage device. A mail server, as referred to herein, can include a server that provides emails based on any suitable protocol such as the post office protocol 3 (POP3), the internet message access protocol (IMAP), the messaging application programming interface (MAPI), or a web-based email protocol, among others. For example, the filter can enable the data retriever 144 to request or retrieve a fraction of the data associated with a user's email account, social media account, and the like. In some embodiments, the data retriever 144 can periodically retrieve data from a data repository based on the data request, wherein the retrieved data includes a subset of fields of an object to be retrieved. For example, the data retriever 144 can retrieve any suitable portion of an object, such as any suitable field or metadata without retrieving all of the contents of an object.

In some embodiments, the object list updater 146 can update the object list based on the retrieved data. For example, the object list, as referred to herein, can include any suitable number of fields of objects that match the filter. In some embodiments, the object list updater 146 can update an object list to enable the display of new objects. For example, the object list may include any suitable information corresponding to an email inbox, or social media account, among others. The object list updater 146 may update the fields or portions of information displayed for each email or social media account. For example, the object list updater 146 can display a title and date for any number emails in an object list and the object list updater 146 can display the title and date that correspond to newly received emails. In some embodiments, the object list updater 146 can retrieve additional fields for each object in the object list based on techniques discussed in greater detail below in relation to FIG. 3.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the data filter 142, data retriever 144, and object list updater 146 may be partially, or entirely, implemented in hardware and/or in the processor 102. For example, the functionality may be implemented with an application specific integrated circuit, in logic implemented in the processor 102, or in any other device.

Figure 2:
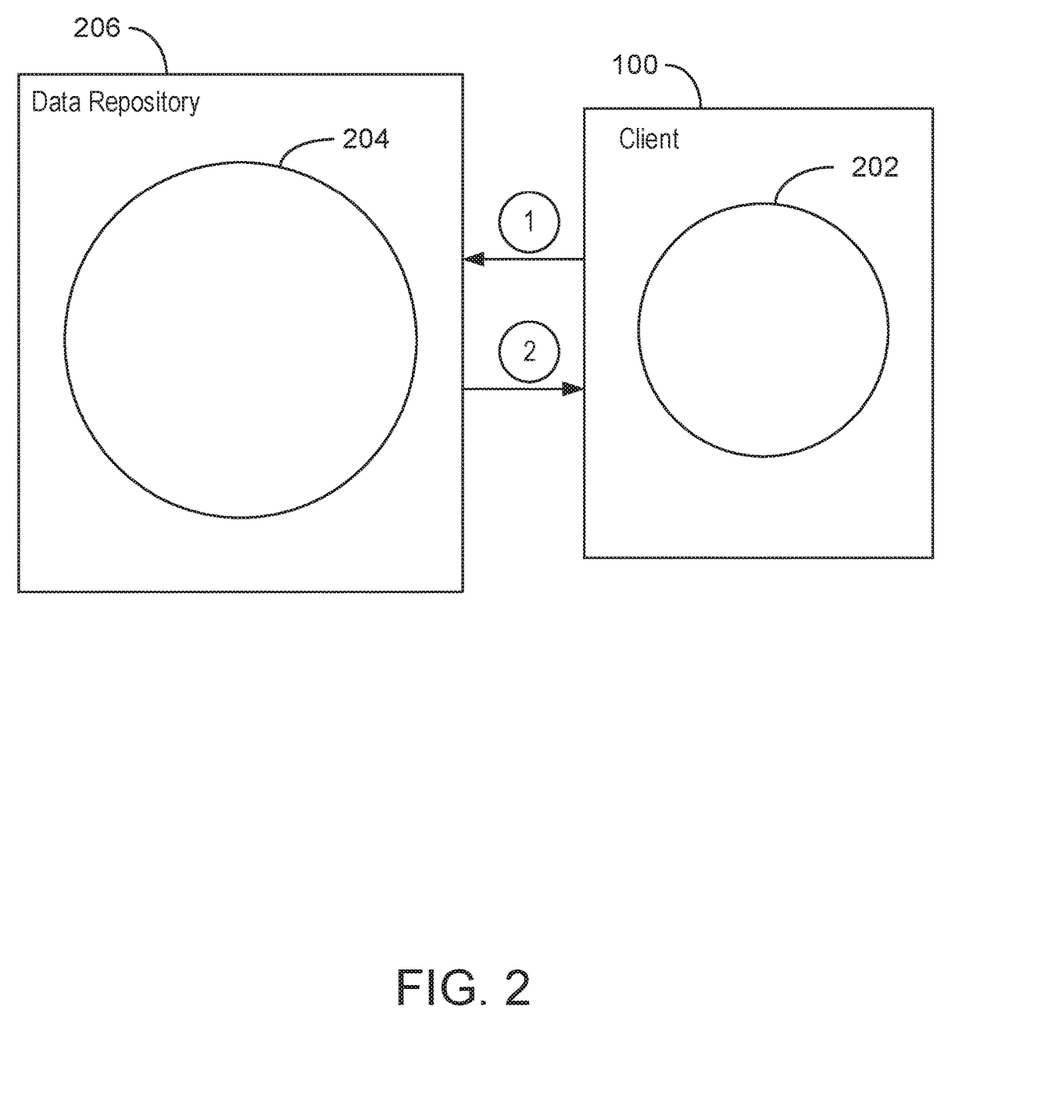
FIG. 2 is a block diagram illustrating a data flow between a client device and a host device according to embodiments described herein.

FIG. 2 is a block diagram illustrating a flow of data between a client device and a host device according to embodiments described herein. The data flow can correspond to data retrieval by the computing device 100 of FIG. 1. In FIG. 2, circle 202 corresponds to a portion of data to be displayed in an object list on a client device, such as the computing device 100 of FIG. 1. The circle 204 corresponds to the information stored for each object related to an account or set of data in a data repository 206. In some embodiments, a filter is transmitted (as indicated by the circled 1) from the client device 100 to the data repository 206. The data repository 206 can determine the objects that satisfy or match the filter and return (as indicated by the circled 2) the matching objects to the client device 100. As discussed above, an object that matches a filter may include any object that satisfies a logical operator or matches a search keyword in the filter as applied to a particular field of an object. For example, the fields of the object can include an author of an object, a title of an object, a subject of an object, a date of an object, and the like. In some embodiments, the filter can indicate the objects in the data repository that are to be returned to the client device 100 based on inclusionary or exclusionary terms. For example, the filter can be inclusionary if the filter indicates objects to be returned if the objects match a search keyword or satisfy a logical operator. By contrast, the filter can also be exclusionary by indicating objects stored in the data repository are not to be returned if the objects match certain exclusionary aspects of the filter. For example, the filter can indicate not to retrieve objects that contain particular terms in a field of an object.

Additionally, the data repository 206 may return portions or fields of each object that matches a filter to the client device 100 rather than returning an entire object. For example, the data repository 206 may return a subject field, a title field, or any other field, stored for each object. In some examples, the data request indicates the fields to be returned to the client device.

Figure 3:
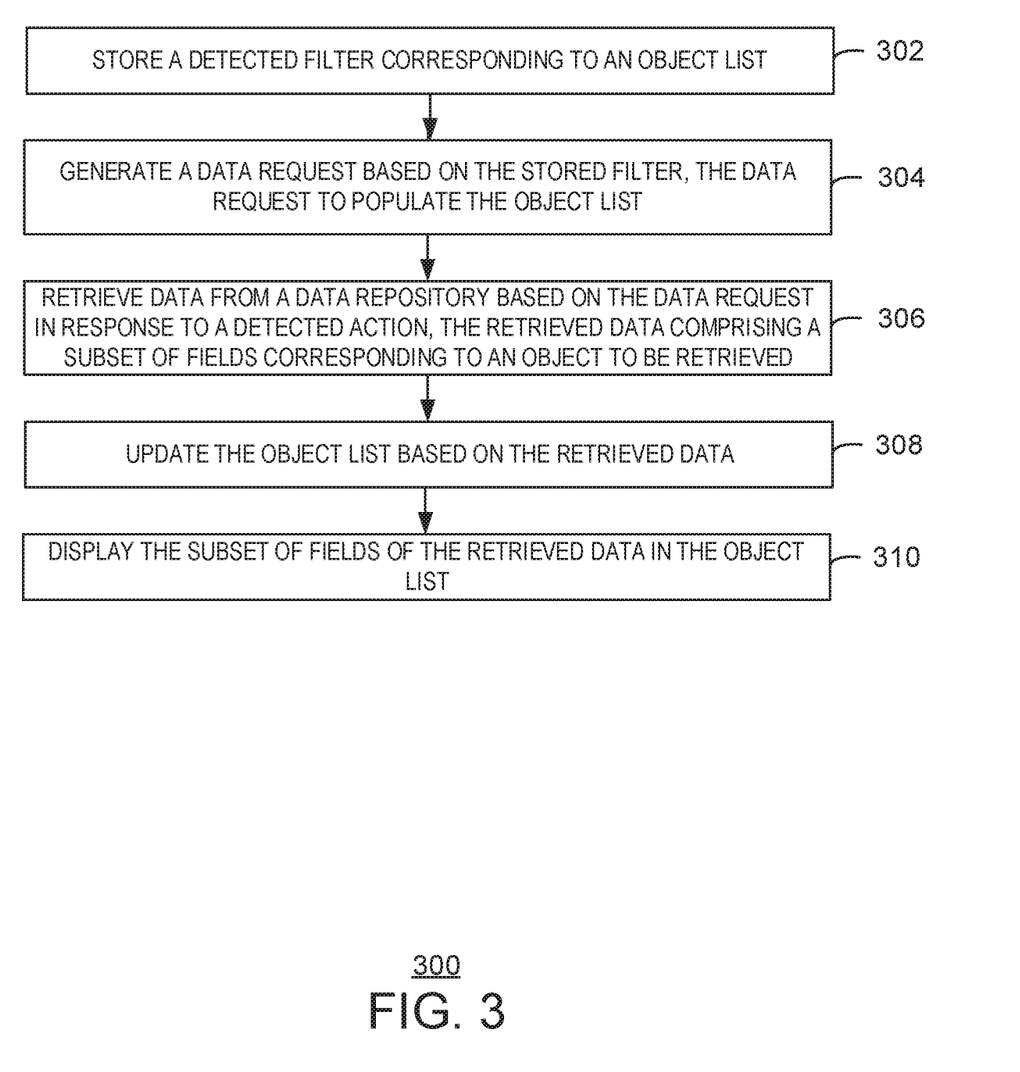
FIG. 3 is a process flow diagram of an example method for retrieving data according to embodiments described herein.

FIG. 3 is a process flow diagram of an example method for retrieving data. The method 300 can be implemented with any suitable computing device, such as the computing system 102 of FIG. 1.

At block 302, the data filter 142 can store a detected filter corresponding to an object list. As discussed above, a filter can provide logical operators, keywords, and the like, which indicate objects that are to be retrieved and displayed on a device. In some embodiments, a filter can also indicate fields or portions of objects that are to be returned. Each object in the object list can represent an email, social media data, and the like. The filter can be detected based on user input or automatically generated using machine learning techniques based on a user's preferences, or detected input over a period of time. For example, the filter can be generated by detecting that a user accesses objects within a particular time frame, which indicates that the filter should prevent retrieval of objects from outside of the time frame. In some embodiments, the filter can be persistently applied over a period of time.

At block 304, the data filter 142 can generate a data request based on the stored filter, wherein the data request can populate the object list. For example, the object list can include a list of fields for any number of objects that correspond to emails in an email inbox, data corresponding to a social media account, and the like. In some embodiments, the object list can include any suitable number of fields or attributes for each object. For example, the object list can include a title, author, and date of an email displayed in the object list. The data request can include the fields to be retrieved from a data repository such as a database or external data storage device.

At block 306 the data retriever 144 can periodically retrieve data from a data repository based on the data request in response to a detected action, wherein the retrieved data comprises a subset of fields corresponding to an object to be retrieved. The data repository can include a master set of data for any number of user accounts. The retrieved data can correspond to one or more of these user accounts. In some embodiments, the data retriever 144 can use a predetermined period of time to prompt the data repository to return new objects that match the filter. In some examples, the data retriever 144 can be automatic or continuous and can constantly poll the data repository for new objects that match the filter. As discussed above, the retrieved data may only include a fraction of the fields stored for each object in a data repository. The remaining fields for each object can be retrieved at a later time based on techniques described below in relation to block 310. In some embodiments, the detected action can include a periodic selection of an application or a selection of an option indicating a continuous update feature. The application can be any program that applies the stored filter to a master set of data in a data repository to retrieve the requested data. In some embodiments, the application can include a continuous update feature that results in an automatic update of objects in a data repository that correspond to the stored filter.

At block 308, the object list updater 146 can update the object list based on the retrieved data. For example, the object list updater 146 can merge the retrieved fields of new objects in the data repository into an existing object list. In some embodiments, updating the object list can include adding fields corresponding to new emails to an object list of emails, adding fields corresponding to new social media data to an object list for a social media account, and the like.

At block 310, the object list updater 146 can display the subset of fields of the retrieved data in the object list. In some embodiments, the object list updater 146 can display the subset of fields of the retrieved data in the object list automatically. For example, the object list updater 146 can display any number of retrieved fields corresponding to an email account, or social media account, among others. In some embodiments, the object list can be rearranged and viewed based on various fields retrieved for each object. In some embodiments, the object list updater 146 can also detect input related to the displayed object list. For example, the object list updater 146 can detect a selection of an object from the object list, retrieve additional fields related to the selected object from the data repository and display the additional fields related to the selected object. In some embodiments, the object list updater 146 can differentiate between a high pressure selection and a low pressure selection of an object. A high pressure selection, as referred to herein, can include any contact with a display device that exceeds a pressure threshold. A low pressure selection, as referred to herein, can include any contact with a display device that is below a pressure threshold. In some examples, the object list updater 146 can detect a high pressure selection of an object in the object list, retrieve additional fields related to the selected object from the data repository, and display the additional fields related to the selected object in the object list based on the high pressure selection.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application. For example, the object list updater 146 can also store retrieved fields of data for each object in the object list in non-persistent memory storage areas so that any loss of power to a device or closing an application maintaining the object list can erase the retrieved data. Furthermore, in some examples, the object list updater 146 can also indicate to the data repository that an object has been viewed in the object list and the data repository can mark the object as viewed. In some embodiments, the data repository can include a custom property feature to store metadata about the state of individual objects. For example, the data repository can store a Boolean value for each object that determines whether the object has been viewed or explicitly hidden by a user on a client device. The client device can use the Boolean values stored on the data repository to determine if objects should be hidden on the client device.

Figure 4:
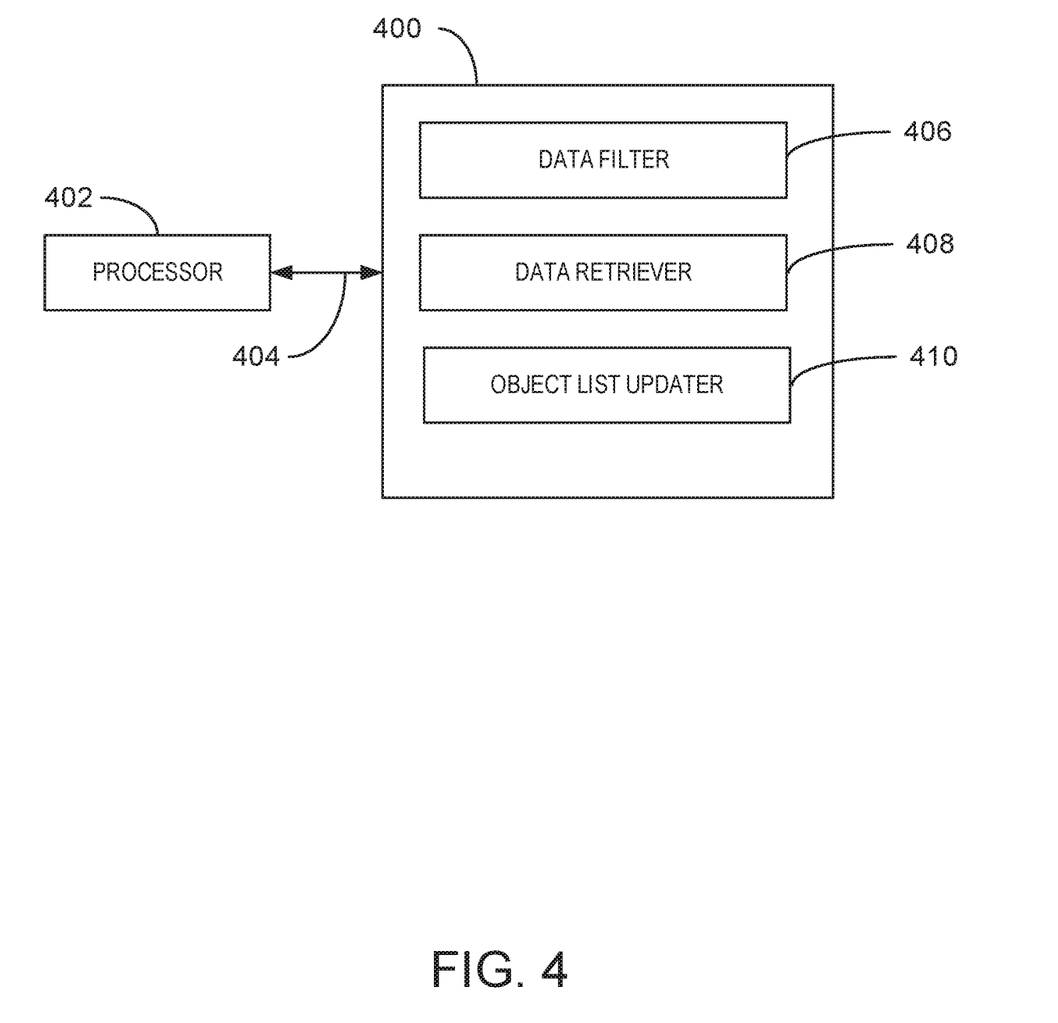
FIG. 4 is a block diagram of an example computer-readable storage media that can retrieve data according to embodiments described herein.

FIG. 4 is a block diagram of an example computer-readable storage media that can retrieve data. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include a data filter 406, a data retriever 408, and an object list updater 410. In some embodiments, the data filter 406 can detect a filter corresponding to an object list. The data retriever 408 can generate a data request based on the filter, the data request to populate the object list and periodically retrieve data from a data repository based on the data request, the retrieved data comprising a subset of fields corresponding to an object to be retrieved. Additionally, the object list updater 410 can update the object list based on the retrieved data. In some embodiments, any number of fields can be retrieved for any number of objects.

It is to be understood that any number of additional software components not shown in FIG. 4 may be included within the tangible, computer-readable storage media 400, depending on the specific application.

Example 1

An embodiment provides a system for retrieving data including a processor and a computer-readable memory storage device storing executable instructions that, based at least on execution by the processor, cause the processor to store a filter corresponding to an object list. The processor can also generate a data request based on the stored filter, the data request to populate the object list, and retrieve data from a data repository based on the data request in response to a detected action, the retrieved data comprising a subset of fields corresponding to an object to be retrieved. Furthermore, the processor can update the object list based on the retrieved data.

Alternatively, or in addition, the processor can detect a selection of an object from the object list, retrieve additional fields related to the selected object from the data repository, and display the additional fields related to the selected object. Alternatively, or in addition, the processor can store the subset of fields and the additional fields of retrieved data in a non-persistent memory storage area. Alternatively, or in addition, the filter can include at least a logical operator or a keyword corresponding to each object in the object list. Alternatively, or in addition, the processor can detect a high pressure selection of an object in the object list, retrieve additional fields related to the selected object from the data repository, and display the additional fields related to the selected object in the object list based on the high pressure selection. Alternatively, or in addition, each object in the object list can correspond to an email or social media data. Alternatively, or in addition, the data repository can include a set of data corresponding to an account for a user. Alternatively, or in addition, the detected action can include a periodic selection of an application or a selection of an option indicating a continuous update feature. Alternatively, or in addition, the data repository can include an email account and the object list can correspond to a subset of emails retrieved from the data repository.

Example 2

Another embodiment provides a method for retrieving data that can include storing a detected filter corresponding to an object list and generating a data request based on the stored filter, the data request to populate the object list. The method can also include retrieving data from a data repository based on the data request in response to a detected action, wherein the retrieved data comprises a subset of the fields corresponding to at least one object to be retrieved, and updating the object list based on the retrieved data. Furthermore, the method can include displaying the subset of the fields of the at least one object in the object list.

Alternatively, or in addition, the method can include detecting a selection of an object from the object list, retrieving additional fields related to the selected object from the data repository, and displaying the additional fields related to the selected object. Alternatively, or in addition, the method can include storing the subset of fields and the additional fields of retrieved data in a non-persistent memory storage area. Alternatively, or in addition, the filter can include at least a logical operator or a keyword corresponding to each object in the object list. Alternatively, or in addition, each object in the object list can correspond to an email or social media data. Alternatively, or in addition, the data repository can include a set of data corresponding to an account for a user. Alternatively, or in addition, the detected action can include a periodic selection of an application or a selection of an option indicating a continuous update feature. Alternatively, or in addition, the data repository can include an email account and the object list can correspond to a subset of emails retrieved from the data repository.

Example 3

Another embodiment provides one or more computer-readable storage devices for retrieving data comprising a plurality of instructions that, based at least on execution by a processor, cause the processor to store a detected filter corresponding to an object list and generate a data request based on the stored filter, the data request to populate the object list. The plurality of instructions can also cause the processor to retrieve data from a data repository based on the data request in response to a detected action, the retrieved data comprising a subset of fields corresponding to an object to be retrieved. Furthermore, the plurality of instructions can cause the processor to update the object list based on the retrieved data, detect a selection of an object in the object list, and determine selected fields to display in response to detecting the selection, the selected fields comprising the subset of fields. Furthermore, the plurality of instructions can cause the processor to display the selected fields related to the selected object in the object list.

Alternatively, or in addition, the plurality of instructions can cause the processor to detect a selection of an object from the object list, retrieve additional fields related to the selected object from the data repository, and display the additional fields related to the selected object. Alternatively, or in addition, the plurality of instructions can cause the processor to store the subset of fields and the additional fields of retrieved data in a non-persistent memory storage area. Alternatively, or in addition, the filter can include at least a logical operator or a keyword corresponding to each object in the object list. Alternatively, or in addition, the plurality of instructions can cause the processor to detect a high pressure selection of an object in the object list, retrieve additional fields related to the selected object from the data repository, and display the additional fields related to the selected object in the object list based on the high pressure selection. Alternatively, or in addition, each object in the object list can correspond to an email or social media data. Alternatively, or in addition, the data repository can include a set of data corresponding to an account for a user. Alternatively, or in addition, the detected action can include a periodic selection of an application or a selection of an option indicating a continuous update feature. Alternatively, or in addition, the data repository can include an email account and the object list can correspond to a subset of emails retrieved from the data repository.

Example 4

In some embodiments, one or more computer-readable storage devices for retrieving data can include a plurality of instructions that, based at least on execution by a processor, cause the processor to store a detected filter corresponding to an object list, the object list comprising a set of emails associated with a user. The plurality of instructions can also cause the processor to generate a data request based on the stored filter, wherein the data request can populate the object list. The plurality of instructions can also cause the processor to retrieve data from a mail server based on the data request in response to a detected action, the retrieved data comprising a subset of fields corresponding to an email to be retrieved. Furthermore, the plurality of instructions can also cause the processor to update the object list based on the retrieved data, detect a selection of an email in the object list, and determine selected fields to display in response to detecting the selection of the email, the selected fields comprising the subset of fields. In addition, the plurality of instructions can also cause the processor to display the selected fields related to the selected email in the object list. In some examples, the detected action can include a periodic selection of an application or a selection of an option indicating a continuous update feature. Furthermore, in some embodiments, the plurality of instructions can cause the processor to store the subset of fields of retrieved data in a non-persistent memory storage area.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for retrieving data, comprising:
   a processor; and
   a computer-readable memory storage device storing executable instructions that, based at least on execution by the processor, cause the processor to:
      store a filter corresponding to an object list selected by a user;
      generate a data request based on the stored filter, the data request to populate the object list from a plurality of received emails;
      retrieve data from a data repository based on the data request, the retrieved data comprising a fraction of a plurality of fields corresponding to the plurality of received emails, the fraction of the plurality of fields corresponding to the object list;
      display the fraction of the plurality of fields via a display device; and
      update the object list in response to a user selection of a displayed fraction of the plurality of fields, wherein remaining fields related to an email of the plurality of emails are to be retrieved from the data repository to generate an updated object list, and wherein the updated object list is viewed via the display device.

2. The system of claim 1, wherein the processor is to store the fraction of the plurality of fields and the additional fields of retrieved data in a non-persistent memory storage area.

3. The system of claim 1, wherein the filter comprises at least a logical operator or a keyword corresponding to each object in the object list.

4. The system of claim 1, wherein each object in the object list corresponds the email.

5. The system of claim 1, wherein each object in the object list corresponds to social media data.

6. The system of claim 1, wherein the data repository comprises a set of data corresponding to an account for the user.

7. The system of claim 1, wherein the user selection comprises a periodic selection of an application or a selection of an option indicating a continuous update feature.

8. The system of claim 4, wherein the data repository comprises an email account and the object list corresponds to a subset of emails retrieved from the data repository.

9. A method for retrieving data comprising:
   storing a detected filter corresponding to an object list selected by a user;
   generating a data request based on the stored filter, the data request to populate the object list from a plurality of received emails;
   retrieving data from a data repository based on the data request, the retrieved data comprising a fraction of a plurality of the fields corresponding to the plurality of received emails, the fraction of the plurality of fields corresponding to the object list;
   displaying the fraction of the plurality of fields via a display device;
   updating the object list in response to a user selection of a displayed fraction of the plurality of fields, wherein remaining fields related to an email of the plurality of emails are to be retrieved to generate an updated object list; and
   displaying the updated object list via the display device.

10. The method of claim 9, comprising storing the fraction of the plurality of the fields and the additional fields of retrieved data in a non-persistent memory storage area.

11. The method of claim 9, wherein the filter comprises at least a logical operator or a keyword corresponding to each object in the object list.

12. The method of claim 9, wherein the data repository comprises a set of data corresponding to an account for the user.

13. The method of claim 9, wherein each object in the object list corresponds to the email.

14. The method of claim 9, wherein each object in the object list corresponds to social media data.

15. One or more computer-readable storage devices for retrieving data comprising a plurality of instructions that, based at least on execution by a processor, cause the processor to:
   store a detected filter corresponding to an object list selected by a user;
   generate a data request based on the stored filter, the data request to populate the object list from a plurality of received emails;
   retrieve data from a data repository based on the data request, the retrieved data comprising a fraction of a plurality of fields corresponding to the plurality of received emails, the fraction of the plurality of fields corresponding to the object list;
   display the fraction of the plurality of fields via a display device;
   update the object list in response to a user selection of a displayed fraction of the plurality of fields, wherein remaining fields related to an email of the plurality of emails are to be retrieved to generate an updated object list; and
   display the updated object list via the display device.

16. The one or more computer-readable storage devices of claim 15, wherein the user selection comprises a periodic selection of an application or a selection of an option indicating a continuous update feature.

17. The one or more computer-readable storage devices of claim 15, wherein each object in the object list corresponds to the email.

18. The system of claim 1, wherein the processor is to indicate that an object to be retrieved has been viewed and mark the object as viewed.

\* \* \* \* \*